United States Patent [19]
Wieck et al.

[11] Patent Number: 5,234,297
[45] Date of Patent: Aug. 10, 1993

[54] LOCKING DEVICE FOR SECURING PIECES OF FREIGHT ON A LOADING FLOOR

[75] Inventors: Juergen Wieck; Guenter Vogg, both of Bremen, Fed. Rep. of Germany

[73] Assignee: Deutsche Aerospace Airbus GmbH, Hamburg, Fed. Rep. of Germany

[21] Appl. No.: 825,621

[22] Filed: Jan. 24, 1992

[30] Foreign Application Priority Data

Jan. 26, 1991 [DE] Fed. Rep. of Germany ....... 4102274

[51] Int. Cl.$^5$ ............................................. B64D 9/00
[52] U.S. Cl. ....................................... 410/77; 410/80; 410/94; 244/118.1
[58] Field of Search ........... 410/77, 80, 90, 91, 410/94, 104, 105, 8–12, 79, 92, 113, 115; 244/118.1

[56] References Cited

U.S. PATENT DOCUMENTS

| | | | |
|---|---|---|---|
| 3,595,176 | 7/1971 | Broling | 410/33 |
| 3,847,344 | 11/1974 | Kulczycki et al. | 410/80 X |
| 4,234,278 | 11/1980 | Harshman et al. | 410/77 X |
| 4,457,649 | 7/1984 | Vogg et al. | 410/46 |

FOREIGN PATENT DOCUMENTS 3107745 9/1982 Fed. Rep. of Germany .

Primary Examiner—Michael S. Huppert
Assistant Examiner—William M. Hienz
Attorney, Agent, or Firm—W. G. Fasse

[57] ABSTRACT

A locking device for securing a piece of freight to a loading floor, especially in an aircraft in which a floor separates an upper deck from a freight space below the deck, is equipped with an adjustable locking mechanism at each end of the locking device. With the locking mechanism, it is possible to secure the locking device to support rails in the loading floor and to also adjust the position of the locking device relative to a neighboring locking device. For this purpose, each locking mechanism is equipped, at each end of each locking device frame, with two teeth plates, one of which is forming a locking end plate at an end of the locking device frame, while the other plate is part of a clamping system relative to which the frame of the locking device can be shifted within certain limits determined by the length of an elongated hole in each locking end plate. Once the locking device is in the desired position, which is indicated by a scale and a marker, the clamping system is secured by tightening nuts on two clamping bolts. Thus, it is possible to adjust each locking device with due regard to the requirements of the piece of freight that is to be tied down.

4 Claims, 4 Drawing Sheets

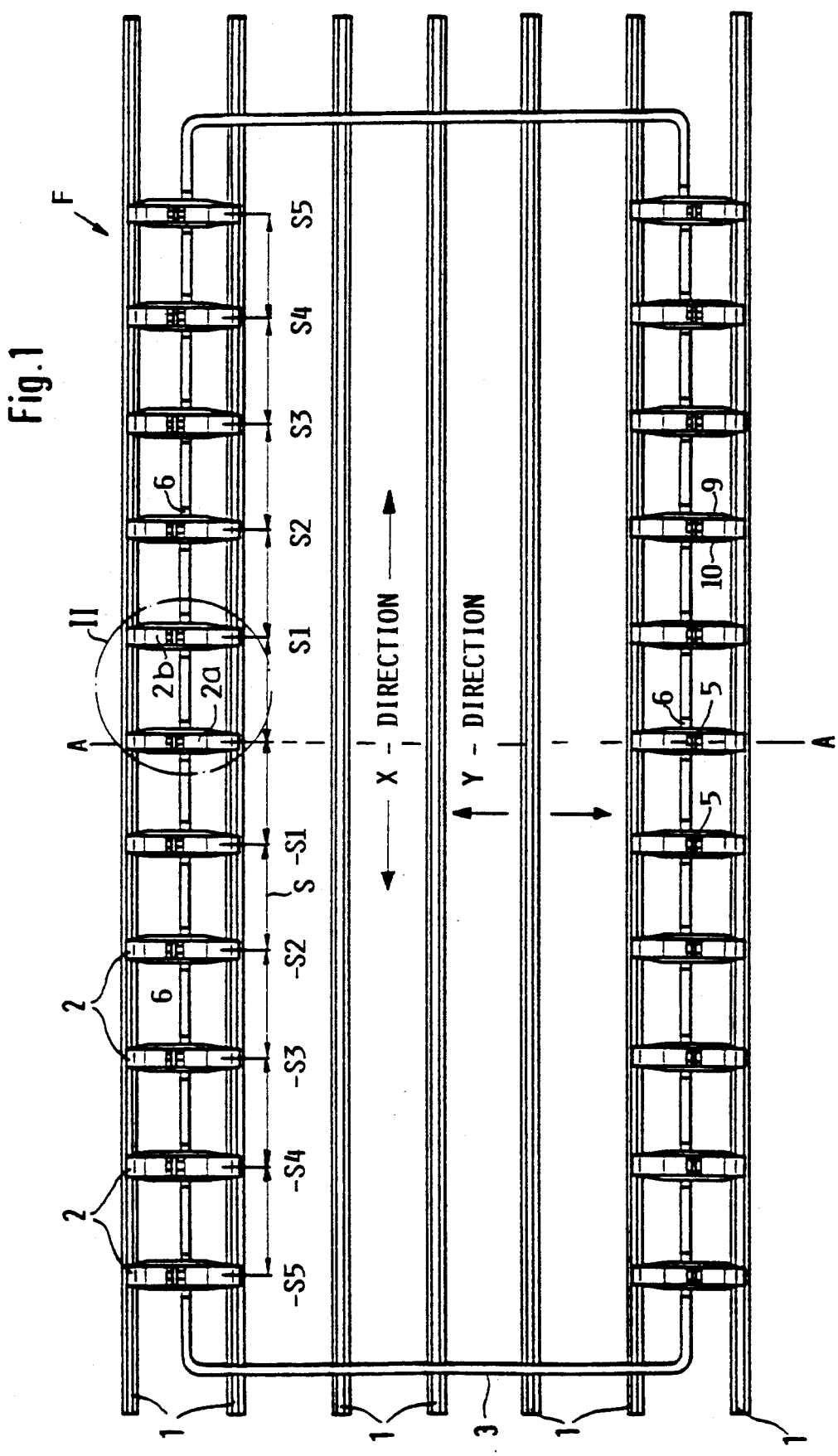

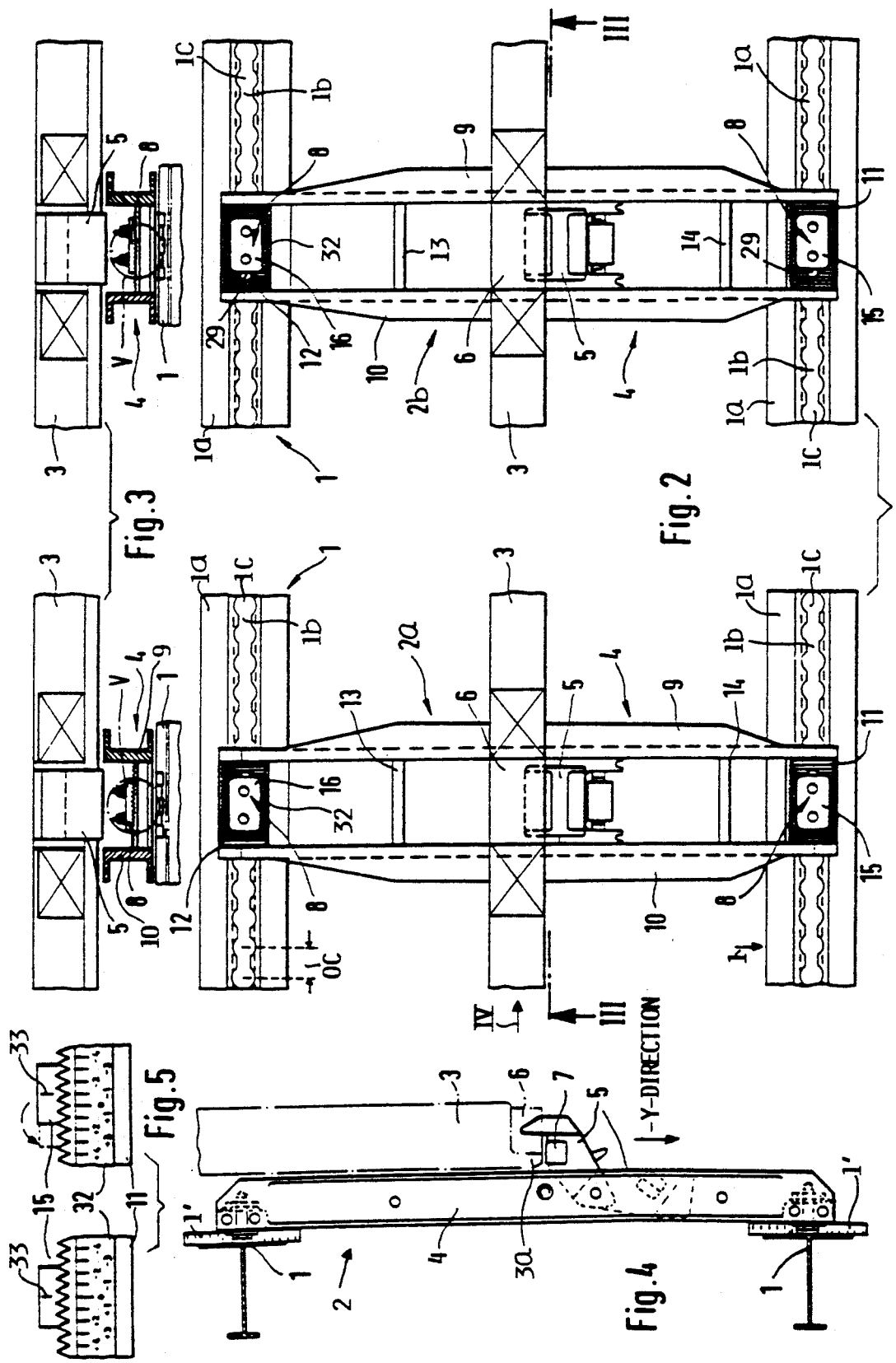

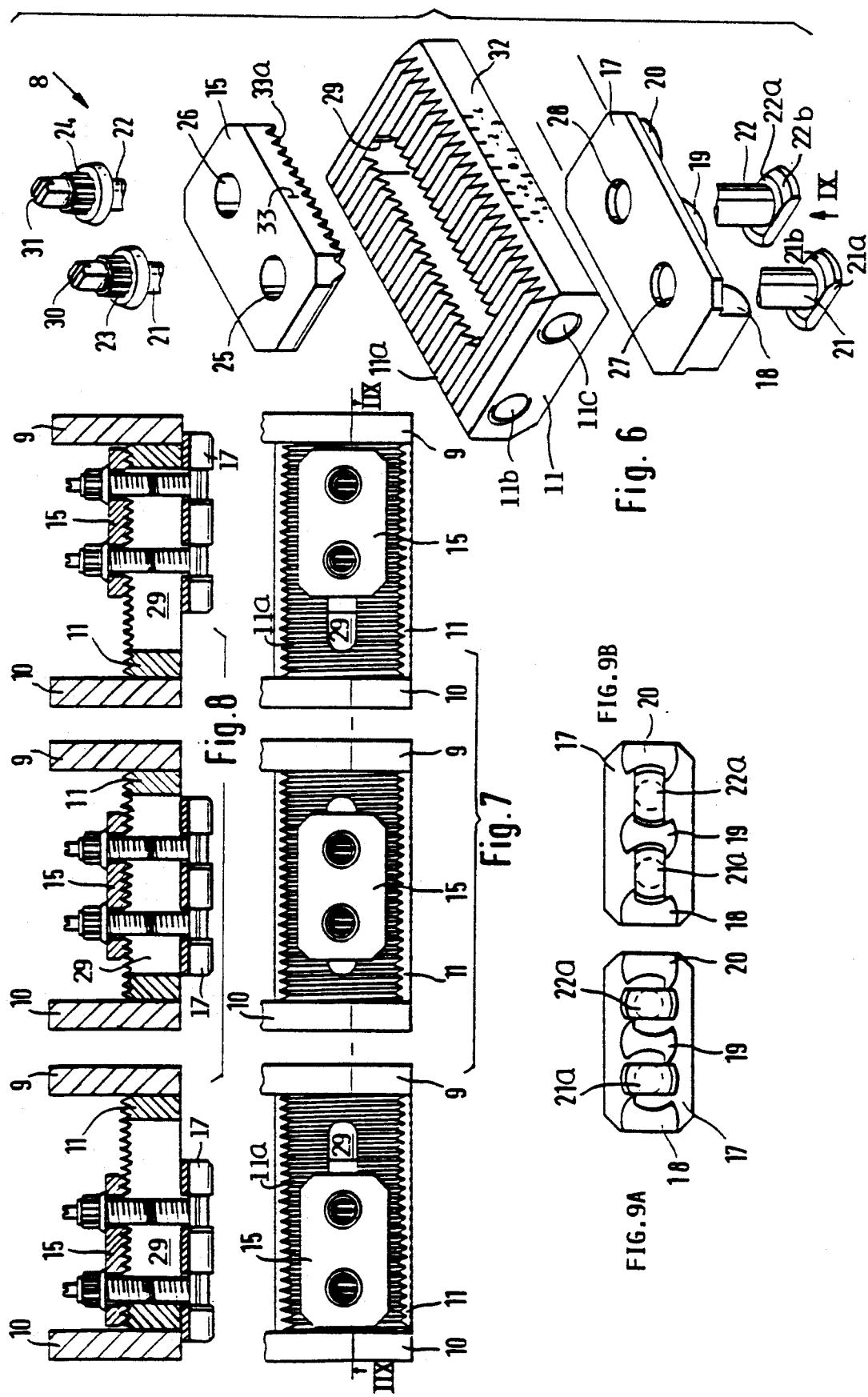

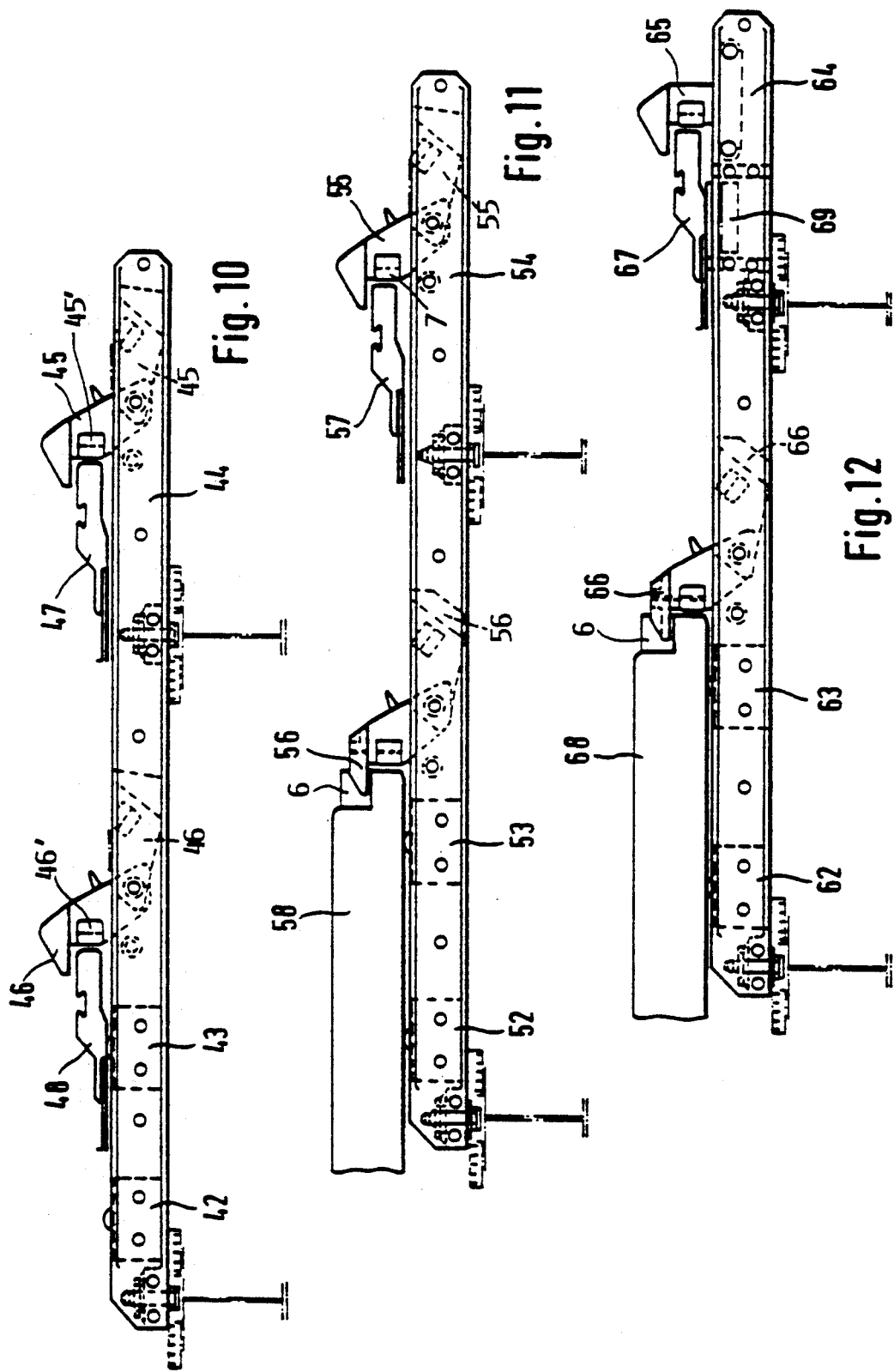

LOCKING DEVICE FOR SECURING PIECES OF FREIGHT ON A LOADING FLOOR

FIELD OF THE INVENTION

The invention relates to a locking mechanism for securing pieces of freight in adjustable positions along support rails on a loading deck. The present locking device is especially suitable for use in commercial aircraft that are convertible for passenger service on the upper deck or for freight carrying service on the upper deck.

BACKGROUND INFORMATION

Such convertible aircraft carry in the floor that separates the upper deck from the lower deck or freight space, support rails and the respective locking devices are releasably secured to the support rails. The conventional locking devices include at least one locking hook mounted in a frame which can be secured through locking mechanisms to two support rails extending in parallel to each other in the longitudinal aircraft or X-direction.

German Patent Publication (DE-PS) 3,107,745 corresponding to U.S. Pat. No. 4,457,649 (Vogg et al.), issued on Jul. 3, 1984, discloses a locking device of the type described above. The known locking device serves for the purpose of a so-called YZ-lock. Such a lock provides an arresting force in the Y-direction and in the Z-direction of a three-dimensional coordinate system the X-axis of which extends in the longitudinal aircraft direction. Thus, the so-called YZ-lock arrests a piece of freight, such as a pallet or container in its final loaded position in the cargo hold in the vertical direction, which is the Z-direction, and in the horizontal or lateral direction, which is the Y-direction. This arresting is accomplished by means of the locking hook which is constructed to reach over projections or into pockets of the respective container or pallet.

Freight containers and pallets used for this purpose are frequently standardized and the zones to be engaged by the locking hook, such as recesses or locking pockets, are so constructed and positioned that the locking hook which reaches into a locking pocket provides an arresting also in the X-direction, namely in the longitudinal aircraft direction in addition to the locking in the Y- and Z-directions. Locking arrangements capable of arresting a piece of freight in all three directions of space (X,Y,Z) are subject to the problem that the zones or areas on the pieces of freight which are to be engaged by the locking hook, may have a raster or grid division that may differ from a respective raster division in the support rails to which the locking devices are secured at uniform spacings from one another.

OBJECTS OF THE INVENTION

In view of the above it is the aim of the invention to achieve the following objects singly or in combination:

to construct a locking device of the type described above in such a way, that the locking device is capable of functioning as an adapter between different grid divisions, more specifically, between the on-center spacings of adjustment steps along the support rails on the one hand, and non-matching positions of locking pockets or the like on pieces of freight;

to assure a reliable locking of freight pieces in their final loaded position, even if the raster division also referred to as grid division along the support rails, does not fully match with the location of locking pockets on freight pieces; and to construct a locking device of the type described in such a way that it satisfies different locking purposes and so that it can be equipped with different types of locking hooks such as fixed hooks, tiltable hooks, and even hooks that can be recessed below the loading floor.

SUMMARY OF THE INVENTION

According to the invention a locking device for securing a piece of freight on a loading floor is characterized in that adjustable locking mechanisms form part of the locking device, whereby these locking mechanisms are adjustable into different positions along the above mentioned support rails. The adjustment movement or shifting is permitted by interlocking plates capable of assuming different defined positions relative to each other when released, and to provide a force-locking connection between these plates and thus between the locking device and the support rails when an adjusted position has been assumed.

A freight system may be equipped with locking devices according to the invention, all of which are of the same construction type or of different construction types. By using locking devices of different constructions in the same freight system, the latter becomes very versatile. For example, a locking device according to the invention may be equipped with rigidly mounted locking hooks and/or with tiltably mounted locking hooks, whereby the latter may be of the YZ-type or of the XYZ-type.

The tiltable locking hooks may be further of the type that can be recessed below the level of the loading floor. Any of the present locking devices may be equipped either with one, two, or a multiple number of locking hooks, and these different constructions of the locking device according to the invention may be used in any desired combination on a loading floor to satisfy different loading requirements.

BRIEF DESCRIPTION OF THE DRAWINGS

In order that the invention may be clearly understood, it will now be described, by way of example, with reference to the accompanying drawings, wherein:

FIG. 1 shows a top plan view onto a loading floor of a commercial aircraft, whereby this floor may form either the floor in a passenger cabin, or the floor of a lower deck loading space in an aircraft;

FIG. 2 shows, on an enlarged scale, the area II in FIG. 1;

FIG. 3 is a sectional view along section line III—III in FIG. 2;

FIG. 4 is a view in the direction of the arrow IV in FIG. 2;

FIG. 5 shows on a somewhat enlarged scale, the area V in FIG. 3;

FIG. 6 shows a perspective, exploded view of a locking and adjusting mechanism according to the invention;

FIG. 7 shows a top plan view of three different positions that an adjustment plate with interlocking teeth can assume relative to a fixed interlocking plate of the locking mechanism;

FIG. 8 is a sectional view through FIG. 7 along section line VIII—VIII;

FIG. 9A is a view in the direction of the arrow IX in FIG. 6, showing the heads of clamping screws in a locked position relative to a support rail;

FIG. 9B is a view in the same direction of arrow 9 in FIG. 6, but showing the clamping screw heads in an unlocked position; and FIGS. 10, 11, and 12 show views similar to that of FIG. 4, illustrating locking devices according to the invention equipped with different types of locking hooks.

DETAILED DESCRIPTION OF PREFERRED EXAMPLE EMBODIMENTS AND OF THE BEST MODE OF THE INVENTION

FIG. 1 shows a pallet 3 locked in position on a loading floor F by a plurality of locking devices 2, 2a, 2b of the invention, secured to support rails 1 forming part of the floor F. The locking devices 2 are spaced from one another by an on-center spacing S, in the longitudinal direction X of the loading floor F. The support rails 1 are conventionally inserted into the loading floor so as not to protrude above the upper level of the loading floor F. A Y-direction extends across to an X-direction. A Z-direction not shown, extends vertically and perpendicularly to a plane defined by the X- and Y-directions.

FIG. 4 shows a cross-section of two support rails 1. The upper chord of each support rail 1 has secured thereto a slotted longitudinal rail section 1a provided with a longitudinal slot 1b and with interlocking openings 1c uniformly distributed along the length of the rail section. The on-center spacing OC between neighboring interlocking openings 1c corresponds to the above mentioned raster division. This on-center spacing OC is conventionally one inch.

As seen in FIG. 1, a plurality of the locking devices 2 are arranged across two neighboring support rails 1 for securing the freight carrying pallet 3 which, for example, is a so-called twenty foot pallet. The support rails 1 are spaced from one another in the lateral or Y-direction of the floor. Each of the present locking devices 2 extends with its length in the Y-direction from center to center of two neighboring support rails 1, so that each end of each locking device 2 is secured to one of the two neighboring support rails 1. The above mentioned spacing S in the X-direction is about 20 ⅛", whereby such a spacing S determines the position of each locking device 2 relative to a central locking device 2a positioned in axial alignment with a zero-line A—A extending in the Y-direction in FIG. 1. Thus, positive spacings S1, S2, and so forth, may be counted to the right of the line A—A in FIG. 1, while negative spacings —S1, —S2, and so forth, are counted to the left of the line A—A in FIG. 1. The teeth 11a, 33a have a ridge-to-ridge spacing, e.g. of ⅛".

The locking hooks 5 of each locking device 2, 2a, 2b reach into respective pockets 6 of the freight pallet 3.

The construction of the locking devices 2 according to the invention, will now be described with reference to the example of the locking devices 2a and 2b in the circle II shown in FIG. 1, and on an enlarged scale in FIGS. 2, 3, 4, and 5. All locking devices are identically constructed in the present example embodiment. Thus, the same reference numbers are used for the same components of the locking devices shown in FIGS. 2 to 5.

All locking devices 2, including locking devices 2a and 2b, comprise a frame 4 with longitudinal frame sections 9 and 10 forming a cross beam extending in the Y-direction. The frame sections 9 and 10 are interconnected by struts 13 and 14 shown in FIG. 2. Additionally, the frame sections 9 and 10 are interconnected at their ends by rigid interlocking end plates 11 and 12 carrying interlocking teeth 11a as best seen in FIG. 6. These plates will be described in more detail below.

Each locking device 2 carries at least one locking hook 5 which can be rolled over by a piece of freight in the X-direction if the hook 5 is recessed below the level of the floor. As shown in FIG. 4, the locking hook 5 can be tilted downwardly into the frame 4 to a level below the top surface of the loading floor. The locking hook 5 has a nose that engages into a locking pocket 6 of the freight pallet 3 when the hook 5 is in its operating upward position. The locking pocket 6 is somewhat wider than the nose of the hook 5. A roller 7 forming part of the hook 5 forms a stop in the Y-direction and facilitates the guidance of an edge 3a of a pallet 3 as best seen in FIG. 4 in which the X-direction extends perpendicularly to the plane of the drawing sheet.

Referring now to FIGS. 2, 3, 4, and 5, the frame 4 of each interlocking device is interlockable with two support rails 1 by interlocking mechanisms 8 cooperating with the toothed interlocking end plates 11 and 12. The interlocking end plates 11 and 12 cooperate with clamping interlocking plates 15 and 16 also provided with teeth 33a best seen in FIG. 6. For this cooperation, each interlocking end plate 11, 12 is provided with an elongated through hole 29 and with the above mentioned teeth 11a facing upwardly. The clamping interlocking plates 15 and 16 are provided with through bores 25 and 26 and with downwardly facing teeth 33a. The cooperation of these teeth 11a and 13a and the on-center spacing OC permit a defined adjustment of the effective position of the interlocking device 2 in the X-direction. Due to the above mentioned on-center spacing OC, and due to the on-center spacing between neighboring interlocking teeth, between neighboring locking devices 2, the basic spacing S between two such neighboring devices 2, e.g. 2a and 2b, is either 20" or 21". Adjustments in this basic spacing S can be made in ⅛" steps if the on-center spacing between neighboring interlocking teeth is ⅛". For example, the exact spacing S1 between the two locking devices 2a and 2b shown in FIGS. 2, 3, and 4 correspond to 20⅛", since the locking device 2b is displaced by ⅛" to the right. The elongated hole 29 permits such shifting of the end plates 11, 12 relative to the clamping adjustment plates 15, 16 as will be described in more detail below. These cooperating teeth form a multi-teeth click-stop arrangement for an adjustable interlocking between plates 11 and 15 on the one hand, and the plates 12 and 16 on the other hand.

FIG. 5 illustrates the cooperation of a marker 33 on the clamping adjustment plates 15 and/or 16 with a scale 32 on the interlocking end plates 11 and 12 of the locking device 2, 2a, 2b. The scale 32 indicates the 1" ridge to ridge spacings of the interlocking teeth, and the marker 33 indicates a center position. Thus, when the marker 33 coincides with the 0 marker on the scale 32, a centered position is indicated. In this case, the locking device 2a is centered relative to line A—A and the locking device 2b is shifted by ⅛" to the right. These positions of the two locking devices 2a, 2b are directly shown in FIG. 5. The marker 33 and the scale 32 are visible on the end faces as viewed in the Y-direction so that an operator can see and make the adjustment properly. FIG. 6 also illustrates the relationship of the marker 33 with the scale 32.

As mentioned, the rigid adjustment end plates 11 and 12 cooperate with their teeth 11a' with the clamping adjustment plates 15 and 16, whereby the on-center spacing between teeth 11a and between the teeth 33a is the same. The teeth 33a of the adjustment and clamping plates 15 and 16 and the teeth 11a provide a form-and force-locking connection with the respective end plates 11 and 12 with the help of clamping screw bolts 21 and 22 having elongated bolt heads 21a and 22a as best seen in FIG. 6.

FIG. 6 also shows the additional components of the locking mechanism 8 including an arresting plate 17 at each end of the locking device 2, 2a, 2b. Each arresting plate 17 contacts the respective locking plate 11, 12, the position of which is adjustable in the X-direction relative to the arresting plate 17 to the extent determined by the elongated hole 29 in the plate 11, 12. The arresting plate 17 has through holes 27, 28 alignable with the interlocking openings 1c in the support rail. For this purpose, the projections 18, 19, and 20 are so dimensioned that they are received in the gap 1b in the rail section 1a. The bolts 21, 22 pass through the holes 27, 28 in the plates 17, through the hole 29 in the end plates 11, 12 and through the holes 25, 26 in the clamping plates 15, 16. The same construction is used at each end of the frame 4 so that it is sufficient to describe only one construction of the locking member 8. The three downwardly facing projections 18, 19, and 20 of the arresting plate 17 have part of a cylindrical shape as seen in FIG. 6, and are guided along the gap 1c in the rail section 1a as mentioned. The projections 18, 19, and 20 have a diameter and spacing from one another such that the on-center spacing between the holes 27, 28 corresponds to the on-center spacing OC shown in FIG. 2. The clamping screws 21 and 22 passing through these spacings, through the holes 27, 28, through the interlocking openings 1c, through the elongated hole 29, and through the holes 25, 26 have flattened, rectangular heads 21a and 22a to fit into the recesses between the projections 18, 19, and 20. Additionally, the screw heads have clamping ramps 21b and 22b to grip under the edges along the gap 1c of the rail section 1a.

Referring to FIGS. 9A and 9B, the heads 21a and 22a can be rotated with a screwdriver fitting into slots 30, 31 shown in FIG. 6 after the nuts 23, 24 have been loosened. FIG. 9A shows the locked position when the ramps 21b and 22b are reaching under the edges of the rail section 1a. FIG. 9B illustrates the released position when the ramps 21b and 22b of the clamping screw heads 21a and 21b are disengaged from the edges of the rail section 1a. The projections 18, 19, and 20 are configured that they permit a 90° rotation of the heads 21a, 22a. The slots 30 and 31 are aligned longitudinally with the respective heads 21a, 22a so that with the visible position of the slots, the operator knows the orientation of the heads to assure the proper control of the position of the screw heads 21a, 22a.

Referring further to FIG. 6, the adjustment end plates 11 and 12 carry the above mentioned scale markings 32 and the adjustment clamping plates 15, 16 carry the scale marker 33 on outwardly facing sides to be clearly visible to an operator. These markings indicate the position of the frame 4 relative to the support rails 1, as is also shown in FIG. 5.

FIGS. 7 and 8 illustrate the relative position of the clamping plate 15 and the end plate 11 rigidly secured to the frame sections 9 and 10 of the locking device 2, for example, through bolts passing through holes 11b and 11c in the plate 11. These bolts are not shown in the drawings, merely the bolt holes 11b and 11c are visible in FIG. 6. The center portion of FIGS. 7 and 8 shows the adjustment clamping plate 15 centered relative to the adjustment end plate 11 of the locking device 2. The left-hand portion and the right-hand portion of FIGS. 7 and 8 show the two left and right end positions that may be assumed by the plates 11 and 15 relative to each other. The maximum adjustment in each direction out of the centered position is, for example $\frac{1}{2}$" adjustable in four equal steps of $\frac{1}{8}$" each. A total of eight adjustment steps from left to right and from right to left are available, whereby the spacings between the ridges of neighboring teeth 11a is $\frac{1}{8}$".

With this $\frac{1}{8}$" division between neighboring teeth, the total number of locking devices 2 in FIG. 1 is 11 for a pallet 3 having a length of 20 feet. The total of the spacings S is $10 \times 20 \frac{1}{8}"=201.25$ inches. As mentioned above, the marker 33 can also provide an indication of the position of the respective clamping device 2 relative to the coordinate system established by the support rails 1, more specifically, relative to the centerline A—A in FIG. 1.

The locking mechanism 8 shown in FIG. 6 as described above, is suitable to be used according to the invention, as well as for modifying conventional locking devices by simply replacing the non-adjustable end plates in a conventional locking device by the adjustment end plates 11 and 12 with the teeth and by using the adjustment clamping plates 15 and 16 with their respective teeth. The individual locking devices 2 may be equipped with simple locking hooks or they can carry double hooks or multiple locking hooks.

FIGS. 10, 11, and 12 show three locking devices according to the invention, equipped with different types of locking hooks. FIG. 10 shows a locking device 44 carrying two tiltable hooks 45 and 46. These hooks are capable of holding different types of freight pieces 47, 48. Rollers 45', 46' cooperate with the edge of the respective freight piece to guide a freight piece in the X-direction. Ball elements 42, 43 are installed in the locking device 44 to facilitate the rolling of a freight piece into the final, loaded position. The hooks 45, 46 hold a piece of freight in the Y- and Z-direction as so-called YZ-hooks.

FIG. 11 shows an embodiment of a locking device 54 with hooks 55 and 56, both of which are tiltable into the locking device to a level below the floor, just as in FIG. 10. The hook 55 holds a freight piece 57 in the YZ-directions. The hook 56 holds a pallet 58 in the XY- and Z-directions. The pallet 58 rolls on ball elements 52, 53.

FIG. 12 shows a locking device 64 with a rigid, non-tiltable hook 65 holding a freight piece 67 in the Y- and Z-directions. Another tiltable hook 66 holds a pallet 68 in the XY- and Z-directions. The nose of the hook 66, just as the nose of the hook 56, engages into a pocket 6 of the respective pallet 58, 68. The pallet 68 travels on ball roller devices 62, 63. Additionally, the locking device 64 is equipped with roller supports 69 for the freight pieces.

The installation and adjustment of all of the above described locking devices is accomplished in the same manner. First, the nuts 23, 24 shown in FIG. 6 are sufficiently loosened on the clamping screws 21 and 22 so that the individual teeth 11a, 33a on the plates 11 and 15, can be disengaged from one another. Thereafter, the locking device can be displaced in the X-direction by reason of the elongated hole 29 in the adjustment end plates 11, 12. When the desired position is reached, the nuts 23, 24 are partly tightened to such an extent that an unintended displacement is no longer possible. Thereafter, the bolts 21, 22 are rotated with the aid of a screwdriver inserted into the slots 30, 31 until these slots 30, 31 extend in parallel to the longitudinal edges of the clamping plate 17 as shown in FIG. 9B. In this position, the locking device 2 can be inserted into the slot 1b in the top rail section 1a of the support rails 1, whereby the projections 18, 19, and 20 ride in the slot. Then, the bolts 21, 22 are rotated by 90° back into the locking position shown in FIG. 9A, whereby the ramps 21b and 22b of the bolt heads 21a, 22a are wedged under the edges of the rail portions forming the slot 1b. The so adjusted position can now be completely locked by fully tightening the nuts 23 and 24, whereby the entire locking device 2 is rigidly secured to the support rail 1.

Although the invention has been described with reference to specific example embodiments, it will be appreciated that it is intended to cover all modifications and equivalents within the scope of the appended claims.

What we claim is:

1. A locking device for securing of a freight piece to support rails having spaced mounting openings in a loading floor of a freight loading system for an aircraft having a longitudinal X-axis, a crosswise Y-axis, and a vertical Z-axis, said locking device comprising a locking frame structure extending across said longitudinal aircraft X-axis in the direction of said Y-axis, at least one locking hook mounted in said locking frame structure, said locking device further comprising two locking mechanisms, one of said locking mechanisms being arranged at each end of said locking frame structure for attaching said locking frame structure to two of said support rails, whereby a rough position of said frame structure relative to said support rails is determined by an on-center spacing between two neighboring mounting openings in each of said support rails, each of said locking mechanisms comprising adjustment means for adjustably securing each end of said locking frame structure to said support rails, said adjustment means comprising interlocking devices which permit a rigid connection of said locking frame structure in any one of a plurality of fine positions along said rails, wherein said interlocking devices comprise adjustment end plates, one of which is rigidly secured to each end of said frame structure, said interlocking devices further including movable adjustment clamping plates cooperating with said adjustment end plates, all plates carrying interlocking means for interlocking an end plate with a respective clamping plate in any one of said plurality of fine positions, said movable adjustment clamping plates being shorter than said adjustment end plates, said interlocking devices further comprising a scale on one of said plates and a marker on the other of said plates, said scale and marker being movable relative to each other for indicating a relative position between said adjustment end plates and said movable adjustment clamping plates, whereby said fine positions are readable on said scale by correlating said marker with said scale.

2. The locking device of claim 1, wherein said interlocking devices (11, 12, 15, 16) comprise a multi-teeth click-stop arrangement on said adjustment end plates and on said movable adjustment clamping plates, whereby a ridge-to-ridge spacing between two neighboring teeth of said multi-teeth click-stop arrangement determines said fine positions.

3. The locking device according to claim 1, wherein said frame structure comprises elongated frame sections, and wherein said adjustment end plates (11, 12) interconnect said elongated frame sections.

4. The locking device of claim 1, wherein said interlocking devices comprise teeth having a ridge-to-ridge spacing, and wherein said scale has a division corresponding to said ridge-to-ridge spacing.

* * * * *